United States Patent [19]

Sachse et al.

[11] Patent Number: 4,976,914
[45] Date of Patent: Dec. 11, 1990

[54] DEVICE FOR REMOVING A BLOWER FROM A GAS-COOLED NUCLEAR REACTOR

[75] Inventors: Bruno Sachse, Schriesheim; Hubert Weiskopf, Mannheim; Joachim Engel, Hirschberg-Grossachsen; Jakob Zintel, Huettenfeld, all of Fed. Rep. of Germany

[73] Assignee: Asea Brown Boveri Aktiengesellschaft, Mannheim, Fed. Rep. of Germany

[21] Appl. No.: 307,337

[22] Filed: Feb. 6, 1989

[30] Foreign Application Priority Data

Feb. 5, 1988 [DE] Fed. Rep. of Germany ....... 3803434

[51] Int. Cl.⁵ .............................................. G21C 13/06
[52] U.S. Cl. ..................................... 376/391; 376/203
[58] Field of Search ........................ 376/383, 391–394, 376/260, 205, 203; 29/723, 726, 402.03, 402.08, 426.1; 165/76

[56] References Cited

U.S. PATENT DOCUMENTS

| 3,045,895 | 7/1962 | Bolter et al. | 376/383 |
| 3,266,999 | 8/1966 | Wood et al. | 376/383 |
| 4,563,326 | 1/1986 | Ullrich et al. | 376/393 |
| 4,683,111 | 7/1987 | Helm et al. | 376/391 |

FOREIGN PATENT DOCUMENTS 3603092 8/1987 Fed. Rep. of Germany.

OTHER PUBLICATIONS

IAEA SP.–Meeting, San Diego, Nov. 30–Dec. 2, 1987, Giahe Stölzl; "Circulator Experience THTR", pp. 1–12.
IAEA SP.–Meeting, San Diego, Nov. 30–Dec. 2, 1987, Stözl; "25 Years BBC Experience in Circulators", pp. 1–9.
IAEA SP.–Meeting, San Diego, Nov. 30–Dec. 2, 1987, Ziermann Engel; "Circulator Performance AVR"; pp. 1–12.
German Publication: "Janrestagung Kerntechnik", Berlin 1980, pp. 625–628.

Primary Examiner—Daniel D. Wasil
Attorney, Agent, or Firm—Herbert L. Lerner; Laurence A. Greenberg

[57] ABSTRACT

In methods and devices for removing a blower from a gas-cooled nuclear reactor, removal bells have previously been used which require considerable free space above the blower in the case of vertically extending blower configurations. In order to achieve a lower structural height according to the invention, the periphery of the connection location between the blower housing and the steam generator housing is overlapped by a flange ring attached to the steam generator housing. The blower housing performs a vertical moving maneuver within the range of the height of the flange ring, during which a sealing cover and a transport cover are inserted through a lateral opening in the flange ring. The sealing cover is deposited on the edge of the opening of the steam generator housing and the transport cover is coupled to the bottom region of the blower housing. The blower housing is then removed together with the blower.

8 Claims, 12 Drawing Sheets

DEVICE FOR REMOVING A BLOWER FROM A GAS-COOLED NUCLEAR REACTOR

The invention relates to a method and device for removing a blower disposed in a housing which is associated in a vertical extension with a steam generator housing of a gas-cooled nuclear reactor.

In the horizontally constructed blower configuration of the THTR 300 reactor, the shielded removal of a blower requires a bell into which the blower is pulled. For this purpose, a slide valve which is to be alternately operated must be associated both with the housing surrounding the blower and with the bell. Furthermore, the bell causes the housing to be extended so that when the blower is vertically disposed at the top of the reactor vessel, removal with a bell is impossible due to space limitations, unless the reactor building is of a correspondingly higher construction.

It is accordingly an object of the invention to provide a method and device for removing a blower with a vertical blower configuration from a gas-cooled nuclear reactor, which overcome the hereinafore-mentioned disadvantages of the heretofore-known methods and devices of this general type and which do so with a considerably reduced space requirement above the housing for accommodating the blower.

With the foregoing and other objects in view there is provided, in accordance with the invention, a method for removing a blower in a blower housing vertically associated with a steam generator housing of a gas-cooled nuclear reactor, which comprises:

(a) vertically moving the blower housing together with the blower within a flange ring overlapping a joint between the blower housing and the steam generator housing creating a free space in the flange ring, (b) inserting a sealing cover and a transport cover concentrically disposed on the sealing cover through a lateral opening in the flange ring into the free space, (c) depositing the sealing cover on an edge of an opening in the steam generator housing, (d) coupling the transport cover to the bottom of the blower housing while downwardly moving the blower housing, and (e) moving the blower housing together with the blower vertically and laterally beyond the flange ring.

Due to the vertical moving maneuver, the sealing cover and the transport cover carried by it can be inserted between the housing for accommodating the blower and the steam generator housing and can be brought into the sealing and shielding position thereof. During the moving maneuver, the flange ring provides the required sealing with respect to the environment. Only the flange ring with its small space requirement is installed during normal operation of the reactor plant. A free space between the upper housing edge and the space of the reactor building is only required within the range of the height dimension of the flange ring, because the housing with the blower can be laterally moved away after the upper edge of the flange ring has been passed. After removal of the blower, the sealing areas and the flange sealing materials are freely accessible within the framework of radiation protection regulations.

With the objects of the invention in view, there is also provided, in a gas-cooled nuclear reactor including a steam generator housing having an opening formed therein defining an edge of the opening, a blower housing being vertically associated with the steam generator housing at a connection location and having an auxiliary flange projecting therefrom and a bottom, and a blower disposed in the blower housing, a device for removing the blower, comprising a flange ring overlapping the connection location, the flange ring having a lower flange connected to the steam generator housing and an upper flange adjoining the auxiliary flange and maintaining an intermediate space, the flange ring having penetration openings and a lateral opening formed therein, a container flanged to the flange ring at the lateral opening, a transport cradle disposed inside the container, means for vertically moving the blower housing together with the blower creating a free space in the flange ring, a sealing cover supported by the transport cradle for insertion through the lateral opening into the free space and deposition onto the edge of the opening in the steam generator housing, a transport cover concentrically disposed on the sealing cover for insertion through the lateral opening into the free space and coupling to the bottom of the blower housing, and tools to be passed through the penetration openings for locking the transport cover to the bottom of the blower housing.

The intermediate space above the upper flange of the flange ring allows for thermally produced relative expansion free of forces, between the housing for accommodating the blower and the flange ring.

In accordance with another feature of the invention, the sealing cover has two support blocks being mutually offset by 180°, the transport cradle has two support pads, the support blocks and the support pads being bevelled along an inclined plane of contact therebetween forming self-blocking points of contact, and the container has a rear wall facing away from the sealing cover, and there is provided a swivel joint disposed on the sealing cover, and a stop rod connected between the swivel joint and the rear wall of the container.

In addition to its positioning task during the insertion of sealing and transport covers, the stop rod ensures that during the return travel of the transport cradle, the sealing cover remains in its concentric position relative to the opening of the steam generator housing to be sealed, in opposition to the self-blocking action between the support pads and the support blocks, while the lowering of the sealing cover can occur automatically due to its inherent weight. The swivel joint connection between the stop rod and the sealing cover ensures that the lowering movement of the sealing cover is not impeded.

In accordance with a further feature of the invention, there are provided locking screws disposed in holes formed in the upper flange of the flange ring and in the auxiliary flange of the blower housing.

This ensures that when the container is connected, the flange connection between the steam generator housing and the housing for accommodating the blower, which is already detached, cannot be displaced.

In accordance with an added feature of the invention, the moving means move the blower housing through a given maximum vertical distance of displacement, and there are provided guide bolts being longer than the given maximum vertical distance of displacement and extending in along the blower housing through the upper flange of the flange ring and the auxiliary flange of the blower housing After the insertion of the guide bolts, the position is secured in the region of the connecting location or joint.

The locking screws must be removed so that the vertical travelling movement the housing is then made possible.

In accordance with an additional feature of the invention, the support pads are in the form of ribs engaging grooves formed in the support blocks in the vicinity of the inclined plane. This is done in order to achieve a more accurate guidance between the support pads and the support blocks In accordance with yet another feature of the invention, the sealing cover has a centering device for the transport cover. This avoids a relative displacement between sealing cover and transport cover.

In accordance with yet a further feature of the invention, there is provided a flange projection disposed on the flange ring about the lateral opening, and folded-bellows-like sealing elements being disposed between the steam generator housing and the flange ring as well as between the flange ring and the blower housing but leaving the flange projection exposed. This feature optimizes the gas tightness.

In accordance with a concomitant feature of the invention, the flange ring has an upper opening, and one of the sealing elements is brought together between the flange ring and the blower housing after the blower housing has been raised from the vicinity of the flange ring, for gas-tightly enclosing both the upper opening of the flange ring and the bottom of the blower housing.

Other features which are considered as characteristic for the invention are set forth in the appended claims.

Although the invention is illustrated and described herein as embodied in a method and device for removing a blower from a gas-cooled nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
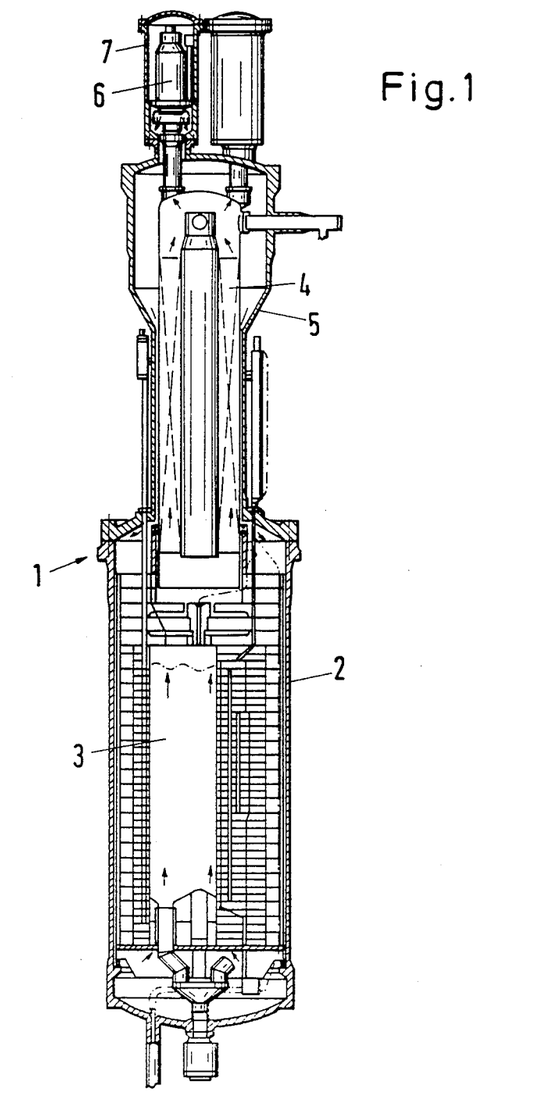
FIG. 1 is a fragmentary, diagrammatic longitudinal-sectional view of a reactor pressure vessel.

Referring now to the figures of the drawing in detail and first, particularly, to FIG. 1 thereof, there is seen a reactor pressure vessel 1 which is formed of a part 2 for accommodating a reactor core 3, a part which is intended for accommodating a steam generator 4 and is therefore referred to as a steam generator housing 5, as well as two parts which are each intended for accommodating one blower 6 and are therefore each referred to as a blower housing 7. The reactor pressure vessel is unpressurized during the blower removal. The illustration and explanation of the parts of the reactor pressure vessel omit those parts which are of no significance to the subject matter of the application.

Therefore, only the upper region of the steam generator housing 5 and the housing 7 for accommodating the blower 6 are dealt with in FIGS. 2 to 9. Identical parts are provided with the same reference symbols in all of the drawings.

Figure 2:
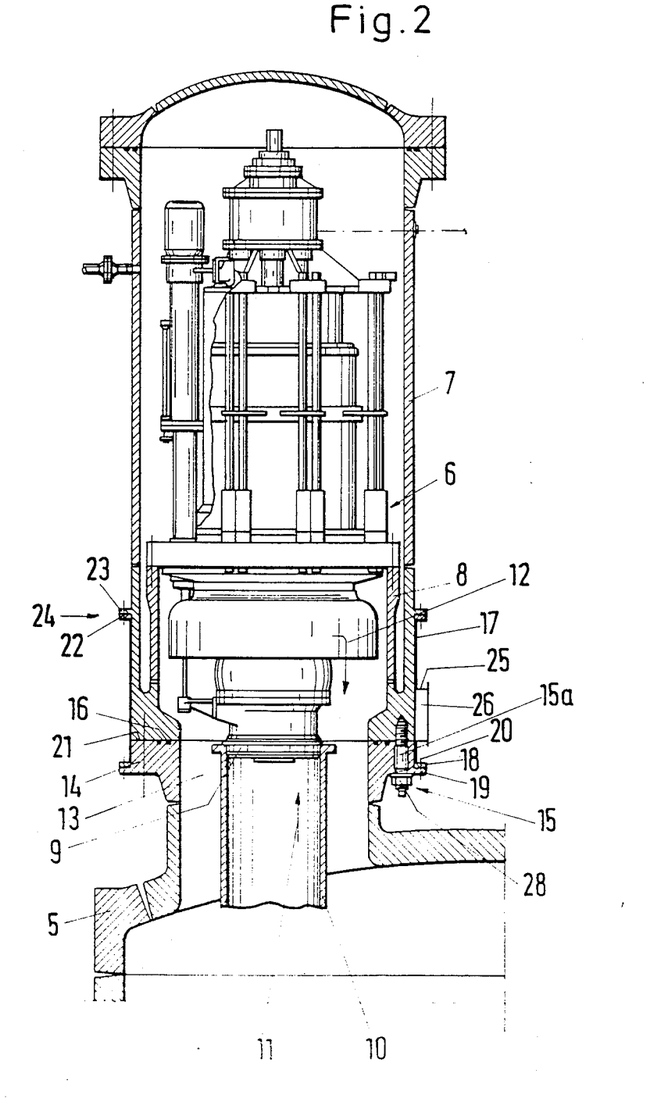
FIG. 2 is an enlarged, fragmentary, longitudinal-sectional view of a portion of the reactor pressure vessel with a housing accommodating the blower.
Figure 3:
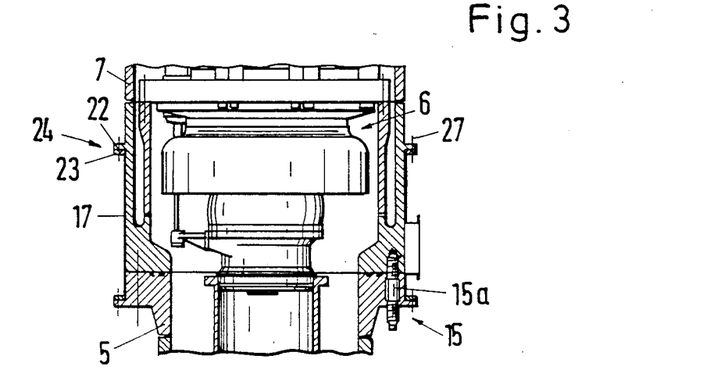
FIGS. 3 to 9 are fragmentary, longitudinal-sectional views showing a step-by-step sequence of a blower exchange.
Figure 4:
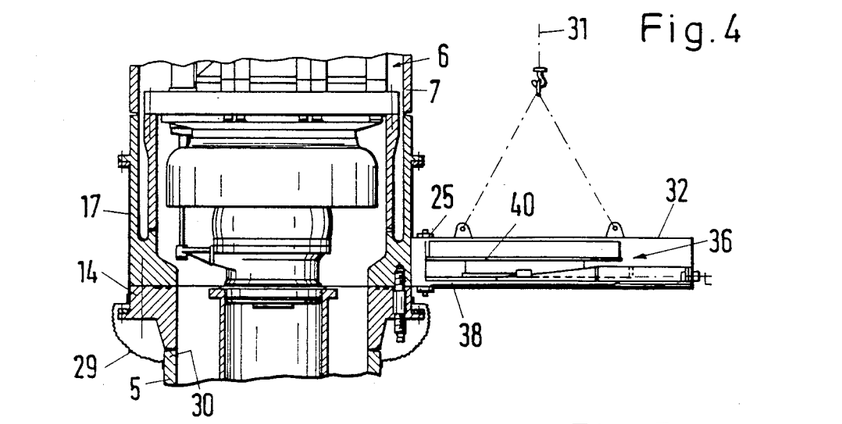
Figure 5:
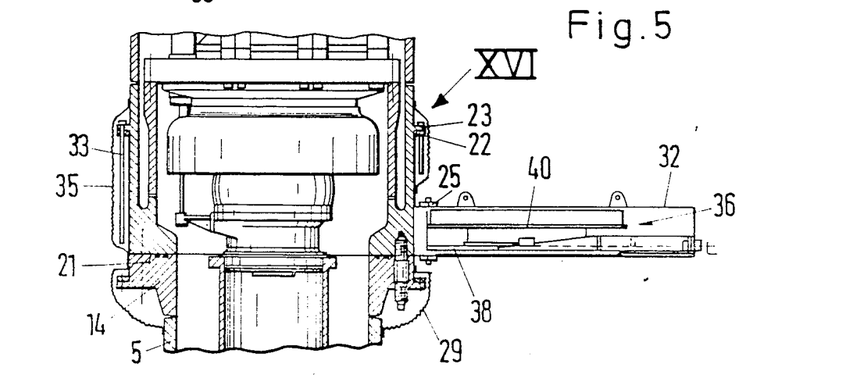

In FIG. 2, the blower 6 which is supported and fixed on a cantilever 8 of housing 7 is shown on an enlarged scale. The blower 6 is coupled through a stub connection 9 to an intake stub 10 associated with the steam generator housing 5. Cooling gas fed in the direction of an arrow 11 returns to the steam generator housing 5 in the direction of an arrow 12. The housing 7 is attached to a flange 14 surrounding an opening 13 of the steam generator housing 5, through a bolted screw connection 15 with the interposition of seals 16. A flange ring 17, which is shown on an enlarged scale in FIGS. 11 to 13, has a lower flange 18 which is attached to an auxiliary flange 19 that projects from the flange 14, by means of screws 20 during normal operation of the plant and during the exchange phase. The flange ring 17 overlaps a connection location or joint 21 between the steam generator housing 5 and the blower housing 7 and has an upper flange 22 which extends into the vicinity of an auxiliary flange 23 projecting from the housing 7. The remaining gap 24 between the flange 22 and the auxiliary flange 23 is required for compensating thermal expansions between the flange ring 17 and the auxiliary flange 23 of the housing 7 without forces. A clearance is provided between the inner peripheral area of the flange ring 17 and the outer peripheral area of the flange 14 and of the housing 7, which allows movement of the flange ring 17 relative to the flange 14 and to the housing 7, respectively.

Figure 10:
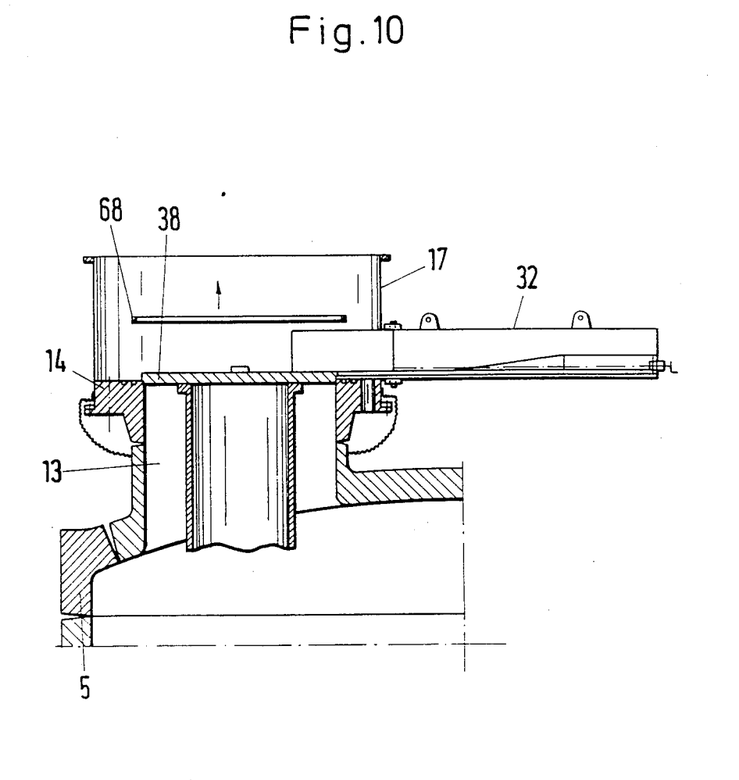
FIG. 10 is a fragmentary, longitudinal-sectional view showing an exchange of a seal.
Figure 11:
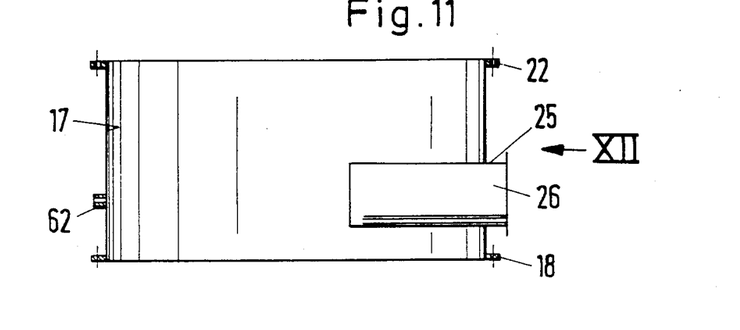
FIG. 11 is a partly sectional elevational view of a flange ring.
Figure 12:
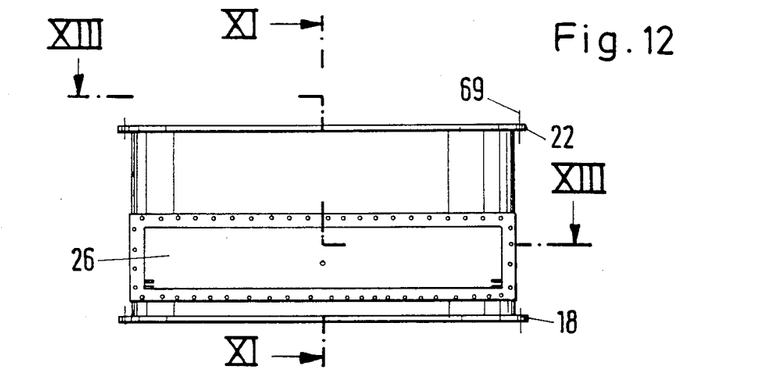
FIG. 12 is an elevational view taken along the direction of an arrow XII in FIG. 11.
Figure 13:
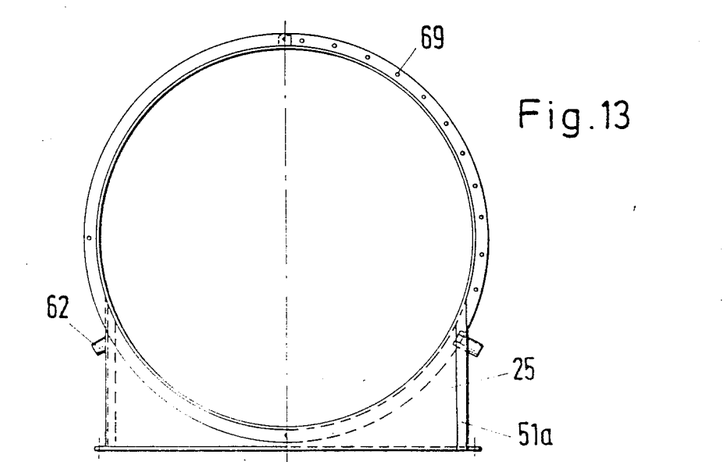
FIG. 13 is a cross-sectional taken along line XIII—XIII in FIG. 12, in the direction of the arrows.

As can be seen more clearly from FIGS. 11, 12 and 13, a flange projection 25 which delimits an opening 26, projects from the periphery of the flange ring 17. The opening 26 has the same cross section as a container 32 represented in FIGS. 4 to 10, 14 and 15.

If a blower 6 is to be removed, it is removed together with the housing 7 in accordance with the invention. For this purpose, the upper flange 22 is connected to the auxiliary flange 23 by means of two locking screws 27 according to FIG. 3. A nut 28 of the bolted screw connection 15 which is represented in FIG. 2, is then removed from a stay bolt 15a. At this stage, a folded-bellows-like sealing element 29, which can be a plastic foil, is attached to the periphery of a neck 30 of the steam generator housing 5 and is attached to the flange 14 above the lower flange 18 by bonding or by other means producing a tight connection in accordance with FIG. 4. The container 32, which is constructed in such a way as to be open only at the end thereof facing the housing 7, is flanged to the flange projection 25 with the aid of a diagrammatically illustrated hoist 31. According to FIG. 5 and the portion thereof shown in FIG. 16, guide bolts 33, which extend axially parallel to the housing 7 and which have free ends that extend into the vicinity of the joint 21 between the steam generator housing 5 and the housing 7, are hooked into through holes 69, 69a in the auxiliary flange 23 and in the upper flange 22 which are not occupied by locking screws 27.

Figure 16:
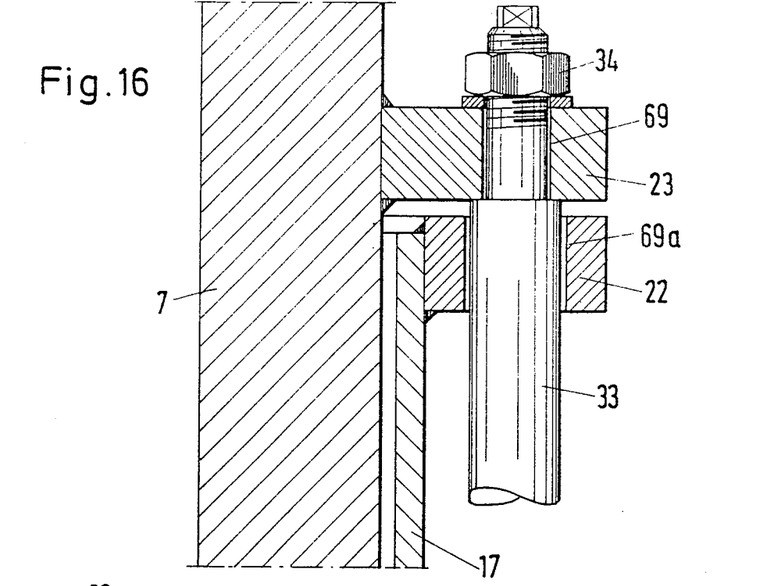
FIG. 16 is an enlarged view of the portion XVI of FIG. 5.

FIG. 16 also shows that the guide bolts 33 which pass through the upper flange 22 and the auxiliary flange 23, are locked with a nut 34. A further folded-bellows-like sealing element 35 is sealingly bonded to the housing 7 and to the flange 14 on the periphery, while leaving the flange projection 25 exposed. A loss of gas from the interior of the reactor pressure vessel is reliably prevented by means of the sealing elements 29 and 35. Furthermore, due to the small clearance between the flange ring 17 and the housing 7 coupled with the low pressure generated in the reactor pressure vessel during the changing of the blower, a gas loss is largely prevented even without the use of sealing elements.

Figure 6:
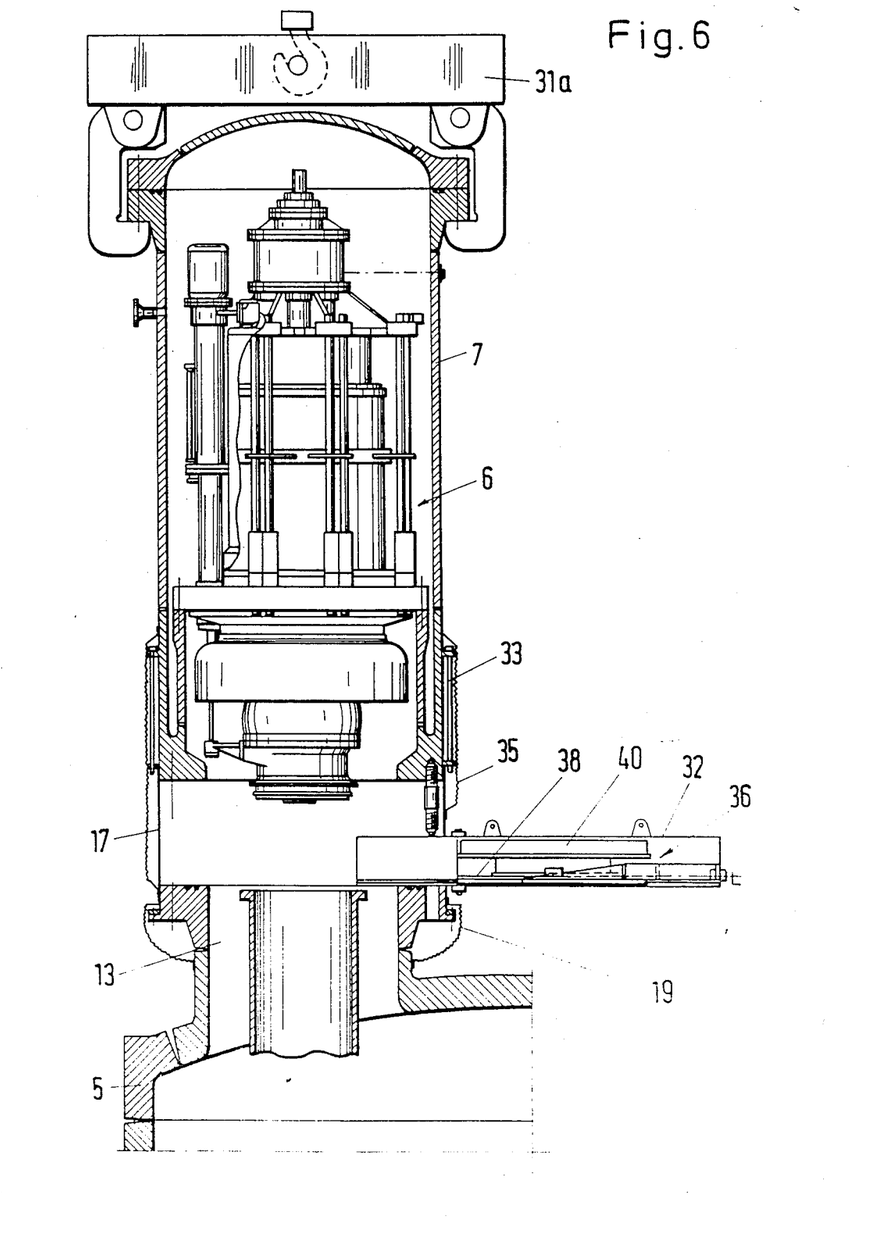

After insertion of the guide bolts 33, the locking screws 27 must be removed in order to be able to perform the lifting of the housing 7 as shown in FIG. 6, with a hoist 31a associated with the non-illustrated nuclear reactor plant. In this connection, the sealing element 35 which is constructed like a folded bellows, also guides the vertical movement of the housing 7. As can also be seen from FIG. 7, the housing 7 is displaced relative to the flange ring 17, which is permanently connected to the auxiliary flange 19 of the steam generator 5, until a transport cradle 36 disposed in the container 32 can be moved into the housing 7 and even the stay bolts 15a screwed into the housing 7 do not impede the cradle movement.

Figure 14:
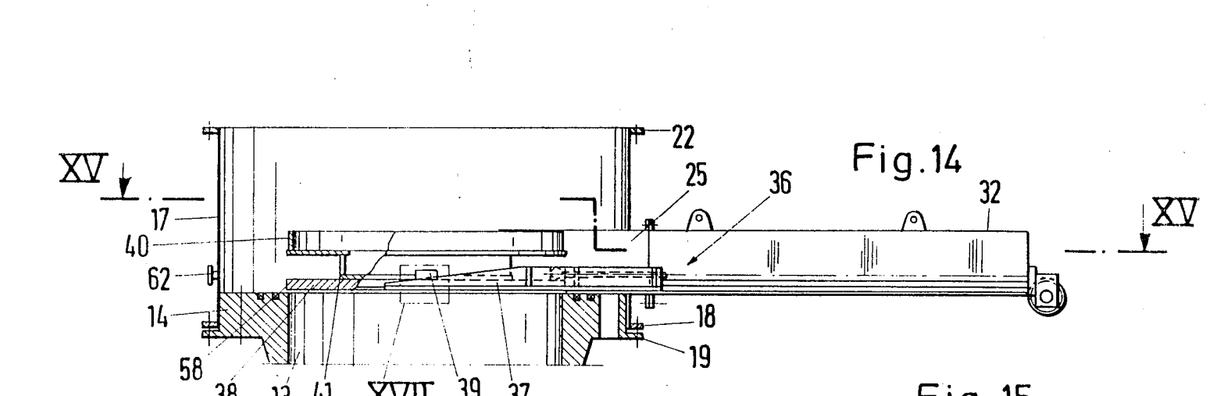
FIG. 14 is a fragmentary, partly sectional view through the flange ring and a container with a transport cradle.
Figure 15:
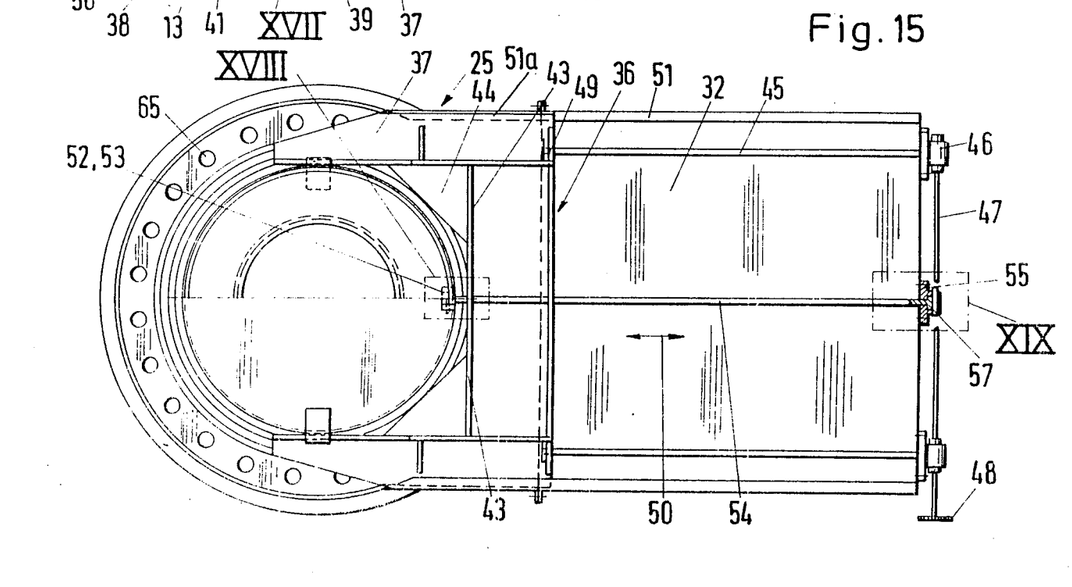
FIG. 15 is a cross-sectional view taken along the line XV—XV of FIG. 14, in the direction of the arrows.
Figures 17, 17A:
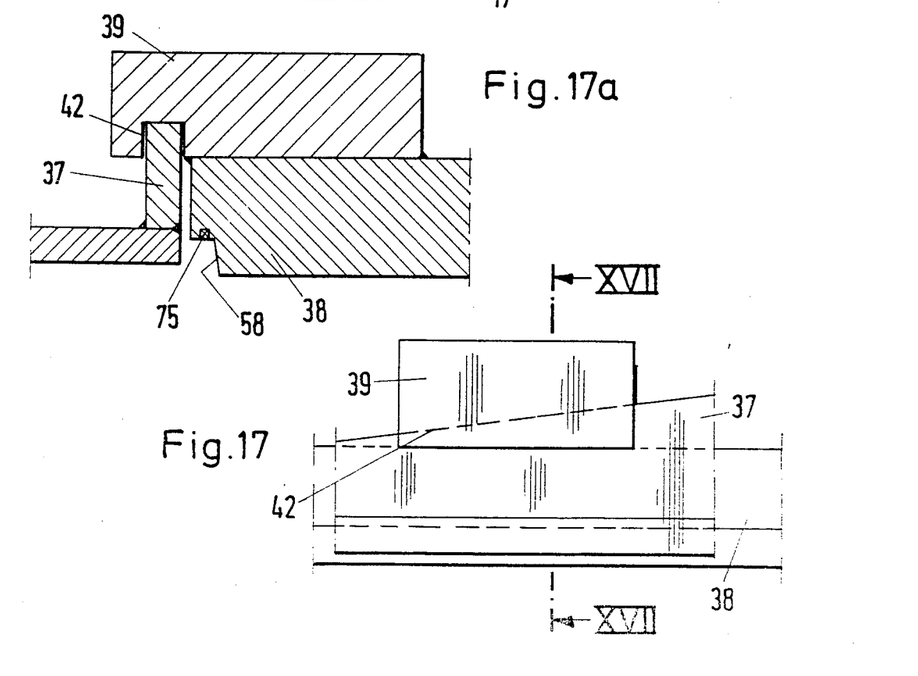
FIG. 17 is an enlarged view of the portion XVII of FIG. 14.
FIG. 17a is a sectional view taken along the line XVII—XVII of FIG. 17, in the direction of the arrows.
Figures 18, 19, 20:
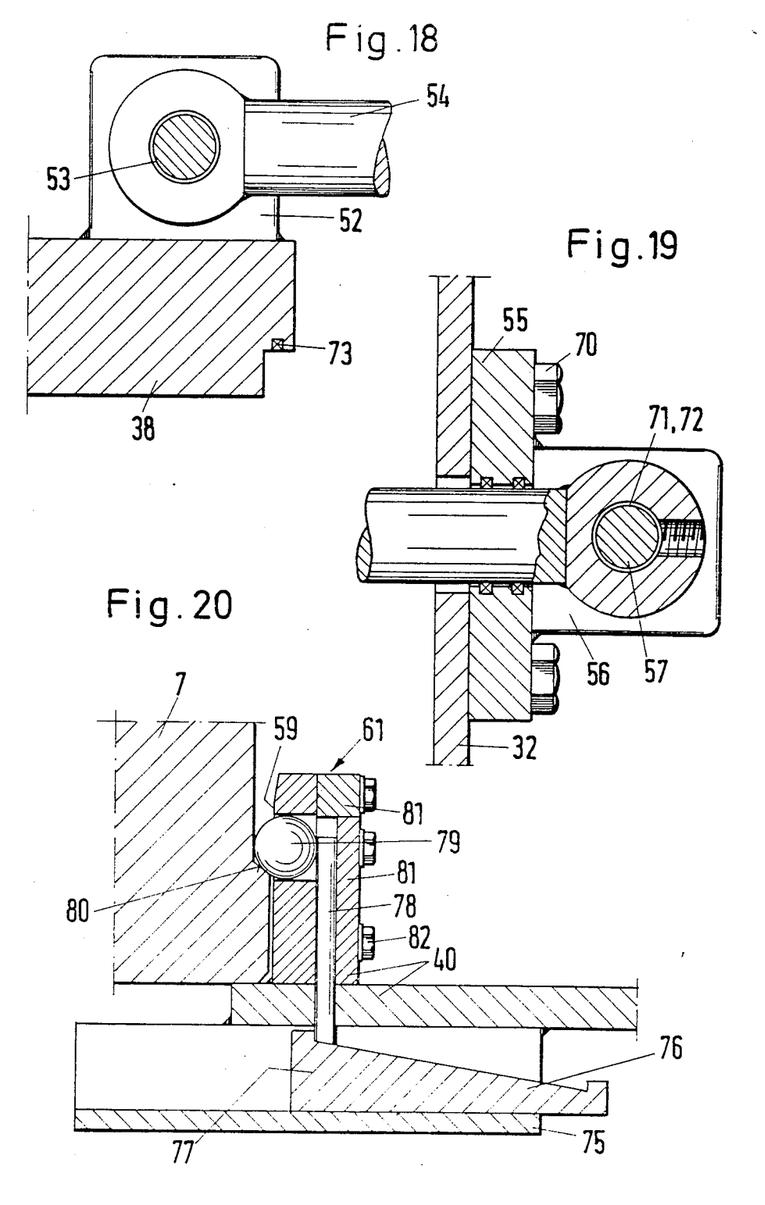
FIG. 18 is an enlarged view of the portion XVIII of FIG. 15.
FIG. 19 is an enlarged view of the portion XIX of FIG. 15.
FIG. 20 is an enlarged view of the locking which takes place between a transport cover and a housing according to FIG. 8.

As can be seen more clearly in FIGS. 14 and 15 in conjunction with the detailed drawings of FIGS. 17 to 19, the transport cradle 36 has mutually parallel support pads 37 which carry a sealing cover 38 that is supported through support blocks 39 associated therewith on the two support pads. The sealing cover 38 carries a transport cover 40 which is disposed concentrically with respect to the sealing cover 38 due to a centering device 41. The support blocks 39 are mounted in such a way as to be mutually offset by 180° on the sealing cover 38 and to project beyond the peripheral area of the sealing cover 38 by a certain extent. A groove 42 which is machined into the underside of the protruding part of the support blocks 39, is formed in such a way as to rise in the direction of the container 32 at the bottom of the groove. The support pads 37 are constructed in such a way as to slope in the same direction at the same angle of inclination as the bottom of the grooves 42. There is a certain clearance between the side walls of the grooves 42 and the side walls of the support pads 37, in order to ensure the relative displaceability. The angle of inclination of the slopes on the support pads 37 and on the bottom of the groove is selected in such a manner that a selfblocking effect occurs and the sealing cover 38 supported on the support pads 37 through the support blocks 39 does not leave its position once it has been taken up on the support pads 37, without the intervention of an external force. Thus, no special holding elements are needed between the support pads 37 and the sealing cover 38. The support pads 37, which are interconnected through a web 43 and cantilevers 44, form the transport cradle 36 together with two threaded spindles 45 and two worm gears 46. The worm gears can be moved simultaneously through a spindle 47 which links the worm gears and a handwheel 48. The threaded spindles 45 are carried in spindle nuts 49 that are associated with the support pads 37, in such a manner that the worm gears which are attached to the rear of the container 32 and engage the threaded spindles, allow the transport cradle 36 to move in the direction of an arrow 50. In this construction, the transport cradle 36 is guided in guides 51 which are disposed on inner wall surfaces of the container 32 and which change into guides 51a of the flange projection 25.

Figure 7:
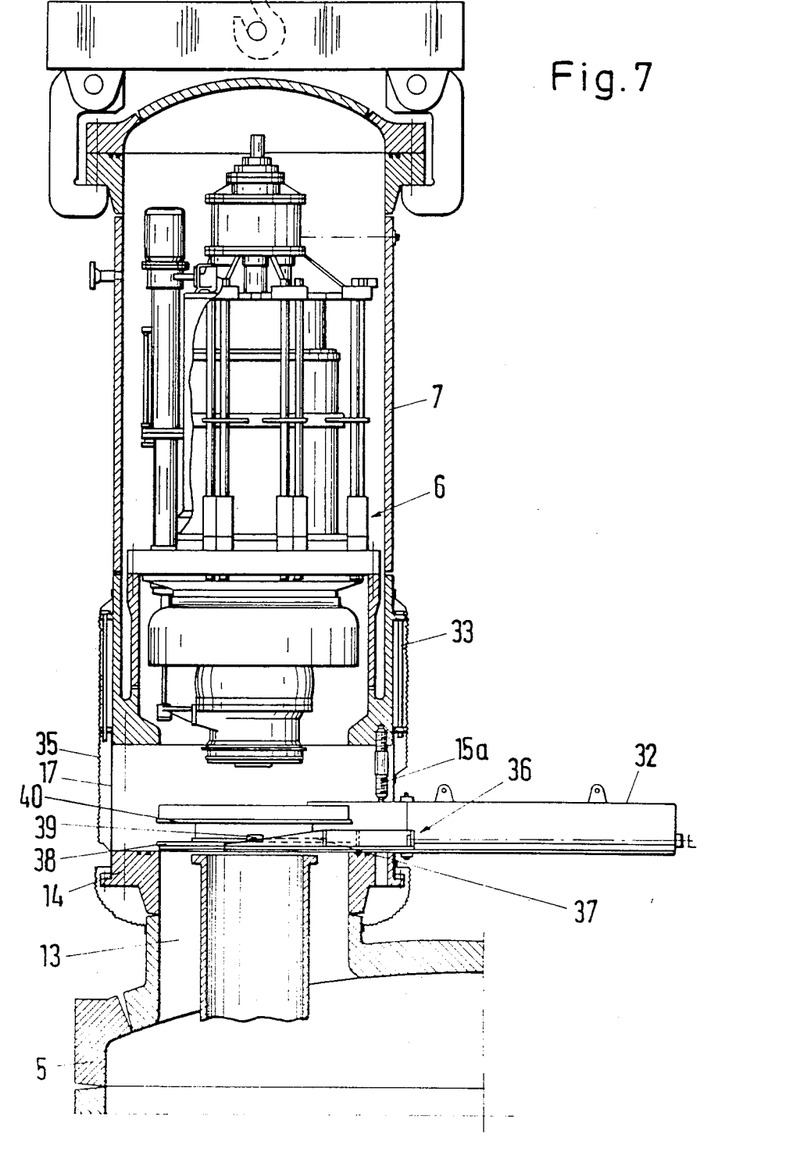

The transport cradle 36 is used for centrally bringing the sealing cover and the transport cover supported thereon into the position shown in FIGS. 7, 14 and 15 with respect to the opening 13 in the flange 14 by rotating the handwheel 48. In order to ensure that the position can be reliably reached by remote control, a holder 52 which is shown in FIG. 18 and is associated with the sealing cover 38, is offset by 90° with respect to the support pads 39. The holder is engaged by a stop rod 54 through a swivel joint 53. As shown in FIG. 19, the end of the stop rod 54 facing away from the sealing cover 38 passes through the rear wall of the container 32 as well as through a holding element 55, which is attached to the outside of the container at that location through screws 70. In this connection, seals 74 ensure that the container 32 is gas tight. The stop rod 54 is held like a pendulum in a fork 56 of the holding element 55 by a cross bolt 57. The transport cradle 36, together with the sealing cover and the transport cover, is only moved in the direction of the housing 7 until the cross bolt 57 can be inserted into transverse holes 71, 72 in the fork 56 and the stop rod 54. The sealing cover 38 has then reached its central position with relative to the opening 13. The stop rod 54 then performs a second task, which is to act as counterforce during the movement of the transport cradle 36 out of the housing 7 until the sliding self-blocking connection between the inclined surfaces of the bottom of the groove 42 and the support pads 37 is broken and due to its inherent weight a region of a projection 58 of the sealing cover 38 is deposited at the edge of the opening 13 with the interposition of a seal 73 seen in FIG. 18. In this connection, the swivel joint 53 between the holder 52 and the stop rod 54 allows the downward movement of the sealing cover even though the stop rod exerts a force acting in opposition to the return movement of the transport cradle 36.

Figure 8:
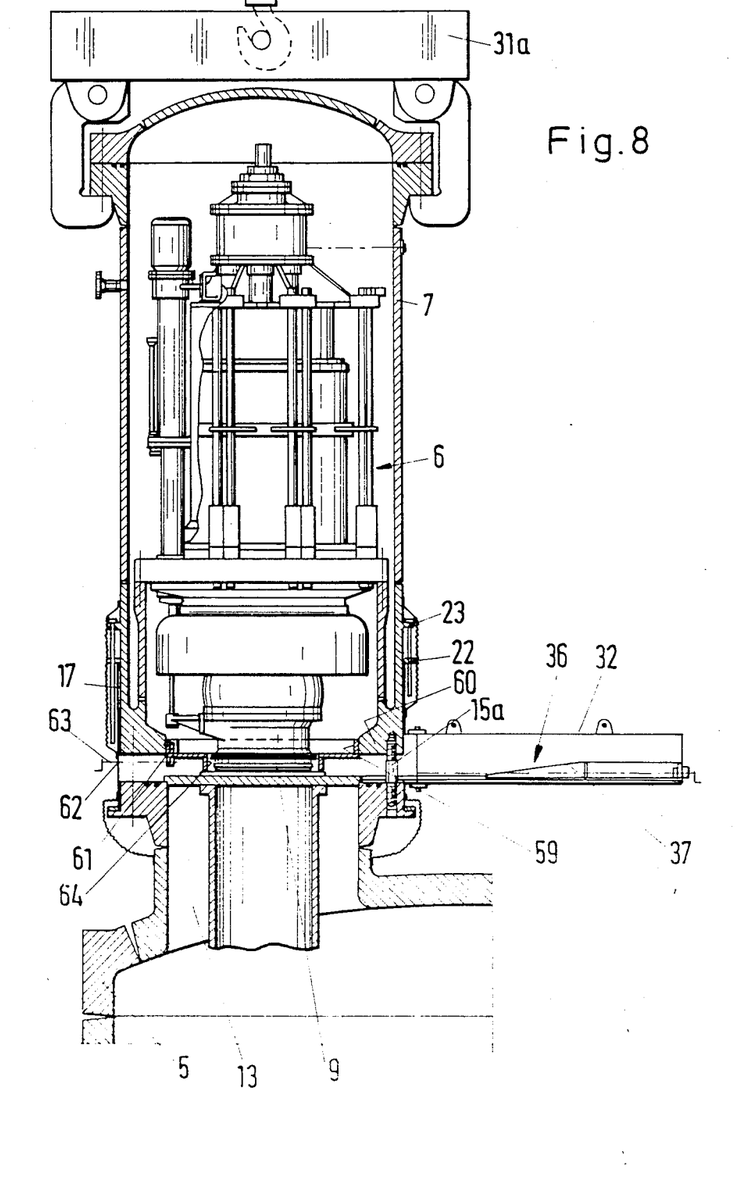

After the transport cradle 36 has completely moved into the container 32, the downward movement of the housing 7, which can be seen in FIG. 8, is effected by means of the hoist 31a until a locking device 61 becomes effective between an outer peripheral region 59 of the transport cover 40 and the inner periphery of the housing bottom 60. The supporting connection between the transport cover and the housing bottom is established through a tool 63 to be inserted through a penetration opening 62 in the flange ring. FIG. 20 shows the structure of the locking device 61. A duct 75 is disposed at the underside of the first step in the transport cover 40. In the duct 75, a wedge 76 can be moved into the illustrated locking position by the tool 63, which is not shown in FIG. 20 but which engages the front 77 of the wedge 76. In this connection, a plunger 78 has been moved upwards so that a sphere 79 comes to rest against a projection 80.

The plunger 78 is guided by lugs 81 which are attached to the transport cover 40 by means of screws 82. The transport cover 40 has a pot-shaped recess 64 formed therein for accommodating a part of the stub connection 9 protruding from the blower 6. During the downward movement of the housing 7 for connection to the transport cover 40, the stay bolts 15a partly plunge into associated holes 65. As a rule, three locking devices engage the periphery of the transport cover.

Figure 9:
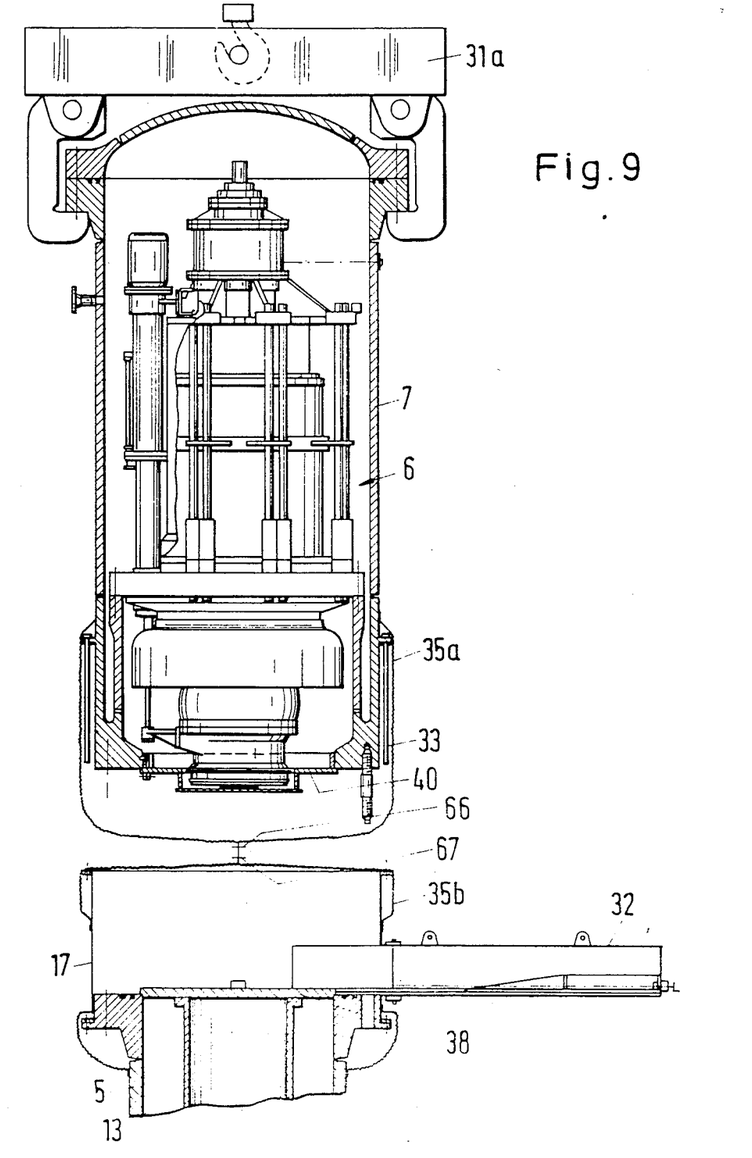

After the transport cover 40 has been coupled on, the housing 7 is moved out of the flange ring 17 until the folded-bellows-like sealing element 35 has been brought together at two positions 66, 67 in accordance with FIG. 9, such as by welding or bonding. The sealing element 35 is separated between the positions 66, 67, forming a sealing element 35a associated with the housing 7 and a sealing element 35b associated with the flange ring 17. The housing 7 is then transported in a dust and gas-tight manner for storage or repair to a non-illustrated location in a non-illustrated reactor building, by means of the hoist 31a. The sealing and the shielding of the steam generator housing 5 and the blower 6 is achieved by the sealing cover 38 and the transport cover 40, respectively.

As can be seen from FIG. 10, a flange seal 68 can be advantageously tested or exchanged after the removal of the sealing element 35b seen in FIG. 9, before a replacement blower with a housing 7 is again installed in the reverse order as compared to the removal thereof.

The foregoing is a description corresponding in substance to German Application No. P 38 03 434.4, dated Feb. 5, 1988, the International priority of which is being claimed for the instant application, and which is hereby made part of this application. Any material discrepancies between the foregoing specification and the aforementioned corresponding German application are to be resolved in favor of the latter.

We claim:

1. In a gas-cooled nuclear reactor including a stream generator housing having an opening formed therein, a blower housing being vertically associated with the steam generator housing at a connection location and having an auxiliary flange projecting therefrom and a bottom, and a blower disposed in the blower housing, a device for removing the blower, comprising a flange ring overlapping the connection location, said flange ring having a lower flange connected to the steam generator housing and an upper flange adjoining the auxiliary flange and maintaining an intermediate space, said flange ring having penetration openings and a lateral opening formed therein, a container flanged to said flange ring at said lateral opening, a transport cradle disposed inside said container, means for vertically moving the blower housing together with the blower creating a free space in said flange ring, a sealing cover supported by said transport cradle for insertion through said lateral opening into said free space and deposition onto the edge of the opening in the steam generator housing, a transport cover concentrically disposed on said sealing cover for insertion through said lateral opening into said free space and coupling to the bottom of the blower housing, and tools to be passed through said penetration openings for locking said transport cover to the bottom of the blower housing.

2. Device according to claim 1 wherein said sealing cover has two support blocks being mutually offset by 180°, said transport cradle has two support pads, said support blocks and said support pads being bevelled along an inclined plane of contact therebetween forming self-blocking points of contact, and said container has a rear wall facing away from said sealing cover, and including a swivel joint disposed on said sealing cover, and a stop rod connected between said swivel joint and said rear wall of said container.

3. Device according to claim 1, including locking screws disposed in holes formed in said upper flange of said flange ring and in the auxiliary flange of the blower housing.

4. Device according to claim 1, wherein said moving means move the blower housing through a given maximum vertical distance of displacement, and including guide bolts being longer than said given maximum vertical distance of displacement and extending in along the blower housing through said upper flange of said flange ring and the auxiliary flange of the blower housing.

5. Device according to claim 2, wherein said support pads are in the form of ribs engaging grooves formed in said support blocks in the vicinity of said inclined plane.

6. Device according to claim 1, wherein said sealing cover has a centering device for said transport cover.

7. Device according to claim 1, including a flange projection disposed on said flange ring about said lateral opening, and folded-bellows-like sealing elements being disposed between the steam generator housing and said flange ring as well as between said flange ring and the blower housing but leaving said flange projection exposed.

8. Device according to claim 7, wherein said flange ring has an upper opening, and one of said sealing elements is brought together between said flange ring and the blower housing after the blower housing has been raised from the vicinity of said flange ring, for gastightly enclosing both the upper opening of said flange ring and the bottom of the blower housing.

* * * * *